(No Model.)
E. D. CROSS.
GALVANIC BATTERY.
No. 398,132. Patented Feb. 19, 1889.
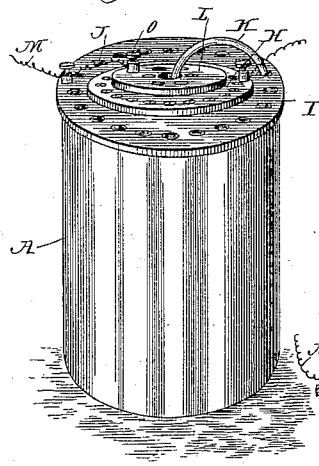
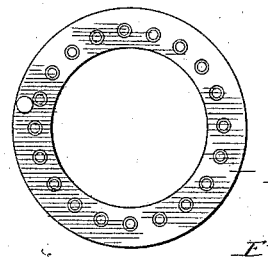
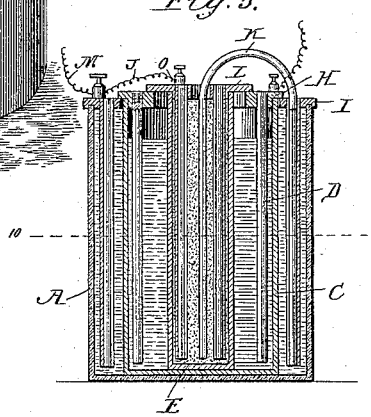
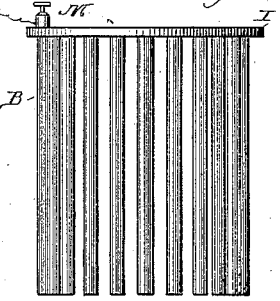
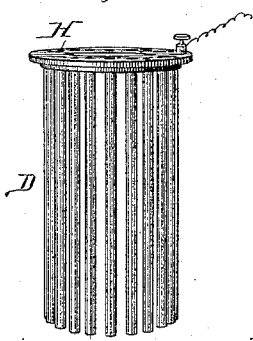
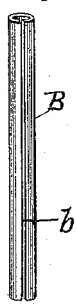
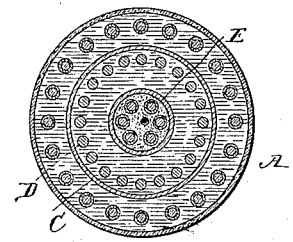
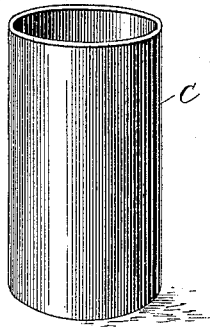
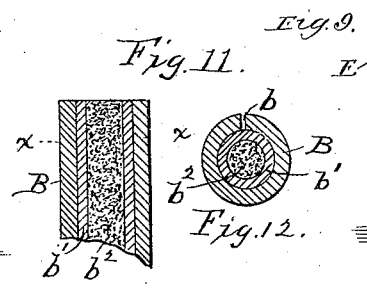
Witnesses
W. Rositer
C. E. Cook
Inventor
E. D. Cross

UNITED STATES PATENT OFFICE.

EBEN DICKEY CROSS, OF CHICAGO, ILLINOIS.

GALVANIC BATTERY.

SPECIFICATION forming part of Letters Patent No. 398,132, dated February 19, 1889.

Application filed August 2, 1888. Serial No. 281,829. (No model.)

*To all whom it may concern:*

Be it known that I, EBEN DICKEY CROSS, a citizen of the United States, residing at Chicago, in the county of Cook and State of Illinois, have invented a certain new and useful Improvement in Galvanic Batteries, of which the following is a specification.

The more prominent objects of my invention are to generate a constant galvanic current of great power; to avoid the escape of noxious or unpleasant fumes or gases from the battery, and also further to utilize the same within the battery; to provide within a comparatively small space a negative electrode having a large area of surface; to prevent the intermixture of solutions in adjacent cells and to permit the current to pass freely; to permit worn-out elements to be readily removed and new ones substituted therefor; to decrease polarization, and to provide certain novel and improved details, all serving to promote the serviceability and general efficiency of galvanic batteries.

To the attainment of the foregoing and other useful ends my said invention consists in matters hereinafter set forth, and particularly pointed out in the claims.

In the drawings, Figure 1 represents in perspective a galvanic battery involving the principles of my invention. Fig. 2 represents an annular carbon-plate which serves to hold the carbon tubes B and to close the cell wherein said tubes are arranged. Fig. 3 represents in side elevation a set of carbon tubes attached to the annular carbon-plate of frame 2, and serving as a part of the negative electrode. Fig. 4 shows in perspective one of the carbon tubes of Fig. 3. Fig. 5 represents a vertical central section through Fig. 1. Fig. 6 represents in perspective a set of zinc rods attached to a metal cap or cover, H, and employed as the positive electrode. Fig. 7 represents one of the two porous cups herein employed for providing a cell. Fig. 8 represents a set of carbon rods or tubes attached to a carbon-plate, which serves to hold the said tubes or rods and cover the cell to which they are allotted. Said rods serve to form one of the parts of the negative electrode, as hereinafter set forth. Fig. 9 represents in perspective a porous cup adapted to provide a cell wherein the carbon rods or tubes of Fig. 8 are to be arranged as in Fig. 5. Fig. 10 is a horizontal section through the battery, taken on a plane indicated by line 10 10, Fig. 5. Fig. 11 represents, on an enlarged scale, a central longitudinal section taken through a portion of one of the tubes B and its filling. Fig. 12 is a cross-section through Fig. 11 on line 11 11.

In said drawings, A indicates the battery-jar or outer cell, which may be either cylindric or polygonal, or of other desired shape. Within the cell A is arranged a porous cup, C, which serves to provide a second cell in the battery. The porous cup C is made somewhat smaller than the jar A, so as to provide between the two such space as may be allotted to the outer cell or compartment, and within the porous cup C is arranged a still smaller porous cup or cell, E. By such arrangement the porous cup E serves to provide a centrally-arranged cell or compartment, while the porous cup C serves to provide a cell or compartment which is intermediate of the said porous cups C and E. For convenience of description I shall therefore hereinafter designate said cells or compartments, respectively, as the first, second, and third cells, the first being the extreme outer cell, the next the second, and the next the third cell.

The positive electrode is formed of zinc, or its equivalent, and consists of a set of rods, D, arranged in angular series and attached at their upper ends to an annular plate, H, of any good conducting material. The zinc rods are temporarily attached to the plate H by screws which pass through the plate and screw into the upper ends of the rods, whereby when the plate which provides a cap or cover for the second cell is removed any or all of the rods can be readily detached from the plate and new ones supplied. The cap H for the second cell is provided with a suitable binding-post, and within the cell I provide a suitable battery solution—such, for example, as a solution consisting of about one part of sulphuric acid to twelve parts of water and about ten grains of bisulphate of mercury to one pint of such solution. I also propose to put into said cell a few ounces of mercury for well-known purposes.

The negative electrode is separated into two parts, which are electrically connected together and respectively arranged in the first and third cells. I also connect together the first and third cells by a tube, K, which extends from the upper portion of one cell to and downwardly within the other cell, whereby fumes rising within one of said cells may be conducted to and discharged within the bottom portion of the other cell. Said tube is herein shown arranged to extend from the upper portion of the first (extreme outer) cell to the third (centrally arranged) cell, within which said third cell the tube extends nearly to the bottom thereof. When the tube is thus arranged, such fumes as may rise within the first cell are discharged into the third cell at a point adjacent to the bottom of the latter, whereby when the third cell is filled to a suitable extent with a vehicle capable of absorbing gases such vehicle will become impregnated with the gases from the first cell and thereby provide an active battery solution. I also propose placing within the third cell a packing consisting of layers of fine charcoal alternating with layers of fine asbestos wool, the lowest layer of the series being preferably of the asbestos. I also introduce into the cell a suitable quantity of water, which will become impregnated with the fumes or gases entering the cell and thereby provide an active solution. The asbestos prevents the charcoal from caking, and the packing serves as a filter, which disposes of such fumes as may not be absorbed by the water.

The foregoing mode of carrying off the fumes from one cell and discharging them into another cell, for the purpose set forth, constitutes a feature of improvement regardless of the material of which the negative electrode is composed. As a further feature of improvement, however, I form the negative electrode of two sets of carbon tubes, one set being arranged within the first cell and the other set within the third cell.

The set of carbon tubes B for the first cell are arranged in annular series (where the cells are of cylindric form) and attached at their upper ends to a flat ring or annular plate, I, which serves as a lid or cover for the first cell. Said cover I is composed of pressed carbon and made of suitable thickness, and as a means for attaching the carbon tubes the lid is provided with a series of holes, Fig. 2, wherein the carbon tubes can be fitted. The lid I has, however, a couple of holes respectively provided for the tube K and for a carbon plug, which latter can be removed for the purpose of introducing the solution. The two holes for such purposes can be provided by omitting to fit carbon tubes in two of the holes in the annular series shown in Fig. 2; or, if desired, other holes can be formed in the cap, so as to avoid interrupting the series of carbon tubes. Each carbon tube is provided with a longitudinally-formed slot, $b$, which desirably faces the porous cup C. The provision of said slots or openings in the carbon tubes allows free circulation of the solution through the tubes and greatly increases the area of surface that is exposed to the solution. Within each slotted carbon tube B, I provide a filling consisting of a cylinder of porous material (preferably porous paper) filled with a packing of asbestos ground into wool.

The porous paper cylinders fit within the carbon tubes as linings for the same, and, while not interfering with the action of the solution, prevent the formation of bubbles on the inner walls of the tubes, and hence check polarization.

The cap or cover I tightly closes its allotted cell, and to such end it is jointed to the jar A and porous cup C, and provided both on its upper and lower sides with a suitably thick coating of paraffine, which not only holds the tubes in place, but also covers over the cap except at the points where the plug and the tube K are arranged. As a simple form of joint the lid I is grooved to receive the top edges of said jar and porous cup.

The third cell, which is formed by and within the small porous cup E, contains a set of carbon rods or tubes, but preferably a set of carbon tubes having longitudinal openings and containing fillings similar to those hereinbefore described in connection with the carbon tubes B. The carbon rods or tubes F are at their upper ends fitted to a carbon-plate, L, in the way that the carbon tubes B are fitted to the carbon-plate I. Said carbon-plate L is applied as a cover for the third cell and should be provided with a suitably thick coating of paraffine, a hole being left in the center of said plate for the glass, rubber, or other suitable tube, N. The carbon-lids I and L are provided with binding-posts electrically connected together by a wire, J, thereby so connecting the two sets of carbon tubes as to form the complete negative electrode.

As a preferred battery solution for the first or extreme outer cell, I propose using a solution of nitric acid and nitrate of ammonium—say about two ounces of nitrate of ammonium to one pint of nitric acid.

The tube K conducts the nitrogen peroxide fumes from the first cell and discharges the same into the lower portion of the third cell, wherein the fumes in rising must necessarily pass through both the asbestos wool and charcoal, and also through the water contained in the cell. The water absorbs such fumes or gases, thereby providing a very active solution, while the charcoal and asbestos necessarily cause such distribution of the fumes as to cause the water to become thoroughly impregnated, any excess of gas not absorbed by the water being filtered through the packing and absorbed by the charcoal.

I also propose varnishing or coating the porous cups C and E on their outer or inner sides, or both, with a thin solution of glue or other gelatine solution, so that, while preventing the ready admixture of the solutions in the cells, such coatings will not interfere with the free passage of the galvanic current. A battery formed as hereinbefore described possesses a powerful electro-motive force, and can readily be taken apart for the purposes of cleaning and repair.

It is herein understood that when the jar A is of other form than cylindrical the form of the lids and arrangement of the carbons will be modified accordingly, and that various minor changes of arrangement could be made without departing from my invention, as will be evident to those skilled in the art.

With further reference to the carbon electrode it will be seen that the paraffine coating for the plate I, to which a set of carbon tubes are attached, (and particularly the paraffine coating applied to the under side of said plate,) serves to hold the tubes in place; but in addition to such function the paraffine coating on the under side of the plate prevents the salts from working through the carbon-plate, and in this respect the paraffine coating on the under side of the carbon-plate is supplemented by the paraffine coating on the upper side of the plate. It will also be observed that the paraffine coatings on the carbon-plate L subserve the same purposes as the paraffine coatings on the plate I.

What I claim as my invention is—

1. In a galvanic battery, the negative electrode separated into two parts, which are electrically connected together and respectively arranged in separate cells, whereof one contains an excitant, in combination with a tube arranged to conduct the fumes from the cell that contains the excitant and discharge the same into the remaining one of said two cells, substantially as set forth.

2. In a galvanic battery, the negative electrode separated into two parts, which are electrically connected together and respectively arranged in separate cells, whereof one contains an excitant, in combination with a tube arranged to conduct the fumes from the cell that contains the excitant and discharge the same into the other cell, which latter contains a vehicle capable of being impregnated with the fumes, so as to provide therein an excitant due to the fumes from the cell wherein they are first generated, substantially as set forth.

3. In a galvanic battery, a carbon electrode consisting of two sets of carbon tubes, which are electrically connected together and respectively arranged in separate cells, whereof one contains an excitant, in combination with a tube arranged to conduct the fumes from the cell that contains the excitant and discharge the fumes into the other cell, substantially as set forth.

4. In a galvanic battery, the negative electrode separated into two parts, which are electrically connected together and respectively arranged in separate cells, whereof one contains an excitant, in combination with a tube arranged to conduct the fumes from the cell containing the excitant and discharge such fumes into the other cell, and a packing of charcoal and asbestus in the latter cell, substantially as and for the purpose set forth.

5. In a galvanic battery, a carbon electrode formed of carbon tubes, each having a longitudinally-formed slot or opening, for the purpose set forth.

6. In a galvanic battery, the combination, with a couple of cells, each having a carbon cover, of a couple of sets of carbon tubes respectively arranged within one and the other of said cells and attached to the carbon covers, said covers being electrically connected together, substantially as set forth.

7. In a galvanic battery, the combination, substantially as hereinbefore set forth, of three concentric cells, a carbon electrode separated into two parts, which are electrically connected together, with one part arranged in the central cell and the other in the extreme outer cell, a zinc electrode arranged within the intermediate cell, and a tube leading from one to the other of the two cells which contain the said parts of the carbon electrode, substantially as set forth.

8. In a galvanic battery, a carbon electrode formed of carbon tubes, each having a longitudinal slot or opening and combined with a filling consisting of a tube or lining of porous material packed with asbestus, substantially as and for the purpose described.

9. In a galvanic battery, a zinc electrode consisting of a set of zinc rods attached to a metal plate by screws which engage in the upper ends of the zinc rods, substantially as and for the purpose described.

10. In a galvanic battery, the negative electrode, combined with a solution of nitric acid and nitrate of ammonium.

11. In a galvanic battery, the negative electrode composed of carbon and combined with a solution of nitric acid and nitrate of ammonium.

12. In a galvanic battery, a carbon electrode composed of carbon tubes, each having a longitudinal opening and containing a filling of asbestus packed in a tube of porous material, combined with a solution of nitric acid and nitrate of ammonium, substantially as set forth.

EBEN DICKEY CROSS.

Witnesses:
HENRY SCHULER,
NORBIN S. GLOVE.